United States Patent
Pal et al.

(10) Patent No.: US 10,673,211 B2
(45) Date of Patent: Jun. 2, 2020

(54) INTEGRATED CONTACTOR MOUNTING POST

(71) Applicant: Hamilton Sundstrand Corporation, Charlotte, NC (US)

(72) Inventors: Debabrata Pal, Hoffman Estates, IL (US); Mark Hamilton Severson, Rockford, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/352,557

(22) Filed: Mar. 13, 2019

(65) Prior Publication Data
US 2019/0214799 A1    Jul. 11, 2019

(51) Int. Cl.
| | |
|---|---|
| H02B 1/56 | (2006.01) |
| H01H 1/62 | (2006.01) |
| H01H 9/52 | (2006.01) |
| H01H 50/12 | (2006.01) |
| B60R 16/03 | (2006.01) |
| H01H 50/14 | (2006.01) |
| H01H 50/54 | (2006.01) |
| H01H 51/06 | (2006.01) |

(52) U.S. Cl.
CPC ............... H02B 1/56 (2013.01); H01H 1/62 (2013.01); H01H 9/52 (2013.01); H01H 50/12 (2013.01); *B60R 16/03* (2013.01); *B64D 2221/00* (2013.01); *H01H 50/14* (2013.01); *H01H 50/546* (2013.01); *H01H 51/065* (2013.01)

(58) Field of Classification Search
CPC ............ H01H 1/62; H01H 9/52; H01H 50/12; H01H 50/14; H01H 50/546; H01H 51/065; H02B 1/56; B60R 16/03; B64D 2221/00

USPC ........................................................ 361/676
See application file for complete search history.

(56) References Cited

U.S. PATENT DOCUMENTS

| | | | |
|---|---|---|---|
| 3,171,069 A | * | 2/1965 | Koltuniak ............ H01L 23/367 257/722 |
| 3,829,647 A | | 8/1974 | Cleaveland |
| 3,879,100 A | | 4/1975 | Chabot |

(Continued)

FOREIGN PATENT DOCUMENTS

| | | |
|---|---|---|
| EP | 2712040 A1 | 3/2014 |
| EP | 2802047 A1 | 12/2014 |

(Continued)

OTHER PUBLICATIONS

Search Report dated Nov. 14, 2018, EP Application No. 18178823.3, 8 pages.

*Primary Examiner* — Anatoly Vortman
(74) *Attorney, Agent, or Firm* — Cantor Colburn LLP (57) ABSTRACT

A contactor assembly post is provided. The contactor assembly post includes a first portion electrically connected to an external bus bar at an exterior of an electrical contactor housing, a second portion electrically connected to an internal bus bar at the exterior of the electrical contactor housing, a third portion and fins. The internal bus bar is configured to extend into an interior of the electrical contactor housing to be electrically coupled to another internal bus bar. The third portion extends transversely between the first and second portions. The fins extend transversely from multiple points defined along a longitudinal axis of the third portion.

20 Claims, 5 Drawing Sheets

(56) References Cited

U.S. PATENT DOCUMENTS

| | | | | |
|---|---|---|---|---|
| 3,958,093 | A * | 5/1976 | Cleaveland | H02B 1/56 |
| | | | | 218/118 |
| 4,005,297 | A | 1/1977 | Cleaveland | |
| 5,337,214 | A | 8/1994 | Linsey et al. | |
| 5,486,972 | A | 1/1996 | Taylor | |
| 5,929,410 | A | 7/1999 | Mun | |
| 6,018,455 | A | 1/2000 | Wilkie et al. | |
| 6,692,296 | B2 * | 2/2004 | Lias | H01R 9/226 |
| | | | | 439/507 |
| 7,837,496 | B1 | 11/2010 | Pal | |
| 8,081,464 | B2 * | 12/2011 | Mauroux | H01H 9/52 |
| | | | | 174/15.1 |
| 8,552,824 | B1 | 10/2013 | Pal | |
| 8,717,746 | B2 * | 5/2014 | Kaufmann | H01H 9/52 |
| | | | | 361/678 |
| 9,001,499 | B2 | 4/2015 | Kolberg et al. | |
| 9,137,925 | B2 | 9/2015 | Pal et al. | |
| 9,142,364 | B2 | 9/2015 | Pal | |
| 9,153,946 | B2 | 10/2015 | Pal | |
| 9,175,694 | B2 | 11/2015 | Pal | |
| 9,245,699 | B2 | 1/2016 | Horowy et al. | |
| 9,418,805 | B2 | 8/2016 | Park | |
| 9,531,170 | B2 | 12/2016 | Pal | |
| 9,536,680 | B2 | 1/2017 | Sippel et al. | |
| 9,613,764 | B1 * | 4/2017 | Pal | H01H 1/62 |
| 9,728,347 | B2 * | 8/2017 | Pal | H01H 1/5805 |
| 9,767,978 | B1 * | 9/2017 | Brandt | H01H 71/0235 |
| 9,855,903 | B1 | 1/2018 | Pal | |
| 9,991,655 | B2 | 6/2018 | Pal | |
| 10,153,629 | B2 * | 12/2018 | Greenwood | F28F 13/08 |
| 2002/0122289 | A1 | 9/2002 | Meiners et al. | |
| 2004/0087221 | A1 | 5/2004 | Meiners et al. | |
| 2010/0282713 | A1 | 11/2010 | Tu et al. | |
| 2016/0172126 | A1 | 6/2016 | Pal | |
| 2017/0076877 | A1 | 3/2017 | Pal | |

FOREIGN PATENT DOCUMENTS

| | | |
|---|---|---|
| EP | 2978074 A1 | 1/2016 |
| EP | 3108957 A1 | 12/2016 |

* cited by examiner

INTEGRATED CONTACTOR MOUNTING POST

CROSS-REFERENCE TO RELATED APPLICATIONS

This application is a divisional of U.S. application Ser. No. 15/628,020, filed Jun. 20, 2017. The entire contents of U.S. application Ser. No. 15/628,020 are incorporated herein by reference.

BACKGROUND

The following description relates to electrical contactors and, more particularly, to an electrical contactor mounting assembly with an integrated contactor mounting post that is capable of dissipating heat.

Contactor assemblies are used in electrical applications, such as aircraft power distribution systems, where power and current flow control of a multi-phase power distribution system is required. A primary power distribution assembly typically has a panel on which several electrical contactors are mounted. Known mounting assemblies used to mount electrical contactors to the panels are constructed of thermally and electrically resistive materials, such as plastics, FR-4 or other woven resin fabric materials.

Each of the contactors is connected to an electrical bus bar and allows current to flow through the contactor and the corresponding bus bar whenever the contactor is in a closed position. The electrical power and current flow through the contactors is controlled by mechanically actuating a contact plate within the contactor such that, when current flow is desired to pass through the contactor, the contact plate is pushed into electrical contact with two leads and forms an electrical path coupling the leads and thereby allowing current to flow through it. Due to the amount of current traveling from the leads to the connector, heat is generated at the contact points and should be removed in order to prevent heat buildup.

To dissipate the generated heat, contactor mounting assemblies have previously used thermally conductive electrical connections to allow the heat from the contact to be transmitted to the bus bars connected to each of the contactor's leads whereby the bus bars then dissipate the heat into the atmosphere using natural convection and radiation techniques. Such cooling methods tend to be inefficient, however, for certain high power applications.

BRIEF DESCRIPTION

According to one aspect of the disclosure, a contactor assembly post is provided. The contactor assembly post includes a first portion electrically connected to an external bus bar at an exterior of an electrical contactor housing, a second portion electrically connected to an internal bus bar at the exterior of the electrical contactor housing, a third portion and fins. The internal bus bar is configured to extend into an interior of the electrical contactor housing to be electrically coupled to another internal bus bar. The third portion extends transversely between the first and second portions. The fins extend transversely from multiple points defined along a longitudinal axis of the third portion.

In accordance with additional or alternative embodiments, the first and second portions are oriented substantially vertically, the third portion is oriented substantially horizontally and the fins are oriented substantially vertically.

In accordance with additional or alternative embodiments, the first or second portions are respectively metallurgically bonded to or integrally connected with the external and internal bus bars.

In accordance with additional or alternative embodiments, the contactor assembly post further includes an insulating outer layer.

According to another aspect of the disclosure, a contactor assembly is provided. The contactor assembly includes internal bus bars, external bus bars respectively associated with the internal bus bars and posts respectively supportive of the internal bus bars and respectively electrically interposed between corresponding pairs of associated external and internal bus bars. Each post includes portions respectively connected to the external and internal bus bars of the corresponding pair and fins extending from between the first and second portions.

In accordance with additional or alternative embodiments, the contactor assembly further includes a panel to which the posts are supportively coupled, a solenoid, a movable bus bar which is movable by the solenoid into a first position at which the internal bus bars are electrically coupled via the movable bus bar or a second position at which the internal bus bars are decoupled and at least one of corrugated fins or flexible straps extending between the movable bus bar and a housing and straight fins extending from the movable bus bar to an exterior of the housing.

In accordance with additional or alternative embodiments, the portions and fins of each post are oriented substantially vertically.

In accordance with additional or alternative embodiments, one of the portions of each post are metallurgically bonded to or integrally connected with the external and internal bus bars.

In accordance with additional or alternative embodiments, the internal bus bars include multiple internal bus bars, the external bus bars include multiple external bus bars and the first and second portions of each post are respectively connected to single ones of the multiple external and internal bus bars.

In accordance with additional or alternative embodiments, the internal bus bars include multiple internal bus bars, the external bus bars include multiple external bus bars and the first and second portions of each post are respectively connected to all of the multiple external and internal bus bars.

In accordance with additional or alternative embodiments, the posts respectively include an insulating outer layer.

According to yet another aspect of the disclosure, a contactor assembly is provided and includes an electrical contactor. The electrical contactor includes a housing defining an interior and internal bus bars that extend into the interior from an exterior of the housing. The electrical contactor is operable in first and second modes in which the internal bus bars are electrically coupled and decoupled, respectively, in the interior. The contactor assembly further includes external bus bars respectively associated with the internal bus bars and posts respectively supportive of the internal bus bars and respectively electrically interposed between corresponding pairs of associated external and internal bus bars. Each post includes first and second portions respectively connected to the external and internal bus bars of the corresponding pair at the exterior of the housing, a third portion extending between the first and second portions and fins extending from the third portion.

In accordance with additional or alternative embodiments, the contactor assembly further includes a panel to which the posts are supportively coupled.

In accordance with additional or alternative embodiments, the contactor assembly further includes a solenoid and a movable bus bar which is movable by the solenoid into a first position at which the internal bus bars are electrically coupled via the movable bus bar or a second position at which the internal bus bars are decoupled.

In accordance with additional or alternative embodiments, the contactor assembly further includes at least one of corrugated fins or flexible straps extending between the movable bus bar and the housing and straight fins extending from the movable bus bar to the exterior of the housing.

In accordance with additional or alternative embodiments, the first and second portions of each post are oriented substantially vertically, the third portion of each post is oriented substantially horizontally and the fins of each post are oriented substantially vertically.

In accordance with additional or alternative embodiments, the first or second portions of each post are respectively metallurgically bonded to or integrally connected with the external and internal bus bars.

In accordance with additional or alternative embodiments, the internal bus bars include multiple internal bus bars at opposite sides of the housing, the external bus bars include multiple external bus bars at opposite sides of the housing and the first and second portions of each post are respectively connected to single ones of the multiple external and internal bus bars.

In accordance with additional or alternative embodiments, the internal bus bars include multiple internal bus bars at opposite sides of the housing, the external bus bars include multiple external bus bars at opposite sides of the housing and the first and second portions of each post are respectively connected to all of the multiple external and internal bus bars.

In accordance with additional or alternative embodiments, the posts respectively include an insulating outer layer.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

As will be described below, a contactor mounting post is provided with integral fins for cooling. The mounting post is bolted to a panel and a contactor and has a perpendicular bus bar with fins. An opposite end of the bus bar has another post to which output or input bus bars are bolted. In this manner, enhanced cooling is achieved. In addition, since current carrying interfaces are at least partially exposed, relatively easy cleaning of bus bar to post and contactor to post bolted joints is enabled.

Figure 1:
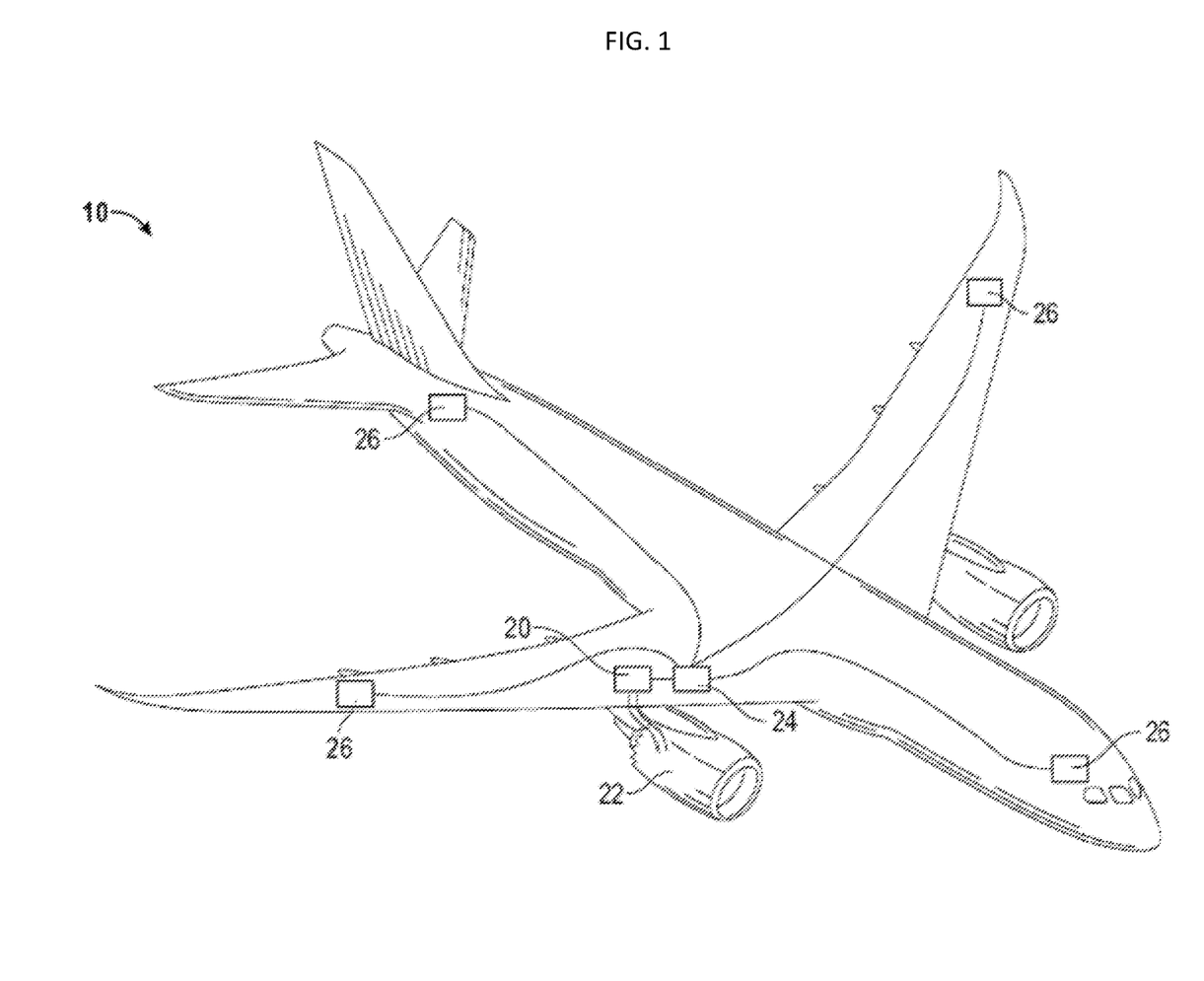
FIG. 1 is a perspective view of an aircraft in accordance with embodiments.

With reference to FIG. 1, an aircraft 10 is provided and includes an electrical power distribution system 20 which utilizes rotation within the jet engines 22 to generate either single phase or three phase electrical power. The power is sent to a panel box 24 that contains multiple electrical buses and contactor assemblies for controlling how the power is distributed throughout the aircraft 10. Through the use of the contactor assemblies, power may be controlled for each onboard electrical system 26 independently.

An exemplary panel box 24 includes multiple bus bars that are interrupted by contactor connections. When the contactor connections are closed, electrical current and heat are allowed to flow between the connected bus bars and a contactor. In conventional systems, excess heat generated in the contactors is transmitted to the bus bars for dissipation by natural convection and radiation into the aircraft internal bay ambient.

Figure 2:
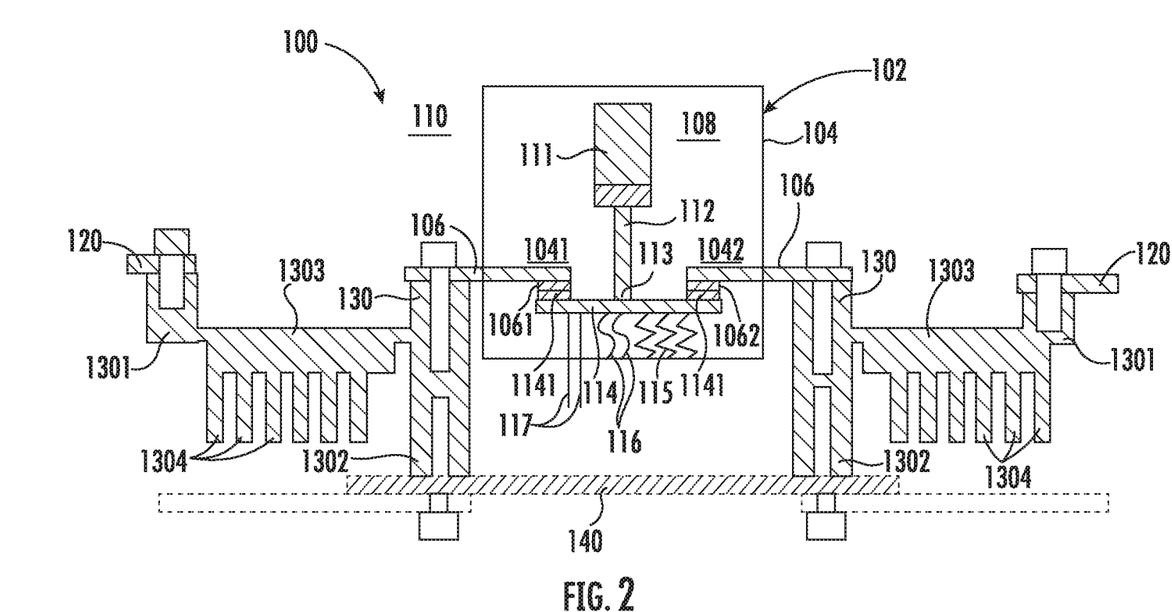
FIG. 2 is a side schematic view of a contactor assembly in accordance with embodiments.

With reference to FIG. 2, a contactor assembly 100 of one or more panel box 24 (see FIG. 1) is provided. The contactor assembly 100 includes an electrical contactor 102 that in turn includes a housing 104 and internal bus bars 106. The housing 104 is formed to define an interior 108 and the internal bus bars 106 extend into the interior 108 from an exterior 110 of the housing 104. The exterior 110 of the housing 104 may be characterized as having an air flow moving through it whereas the interior 108 of the housing 104 lacks such air flow. In any case, the housing 104 may be formed at least partially of electrically conductive and dielectric materials which are each thermally conductive at various rates.

Figure 3:
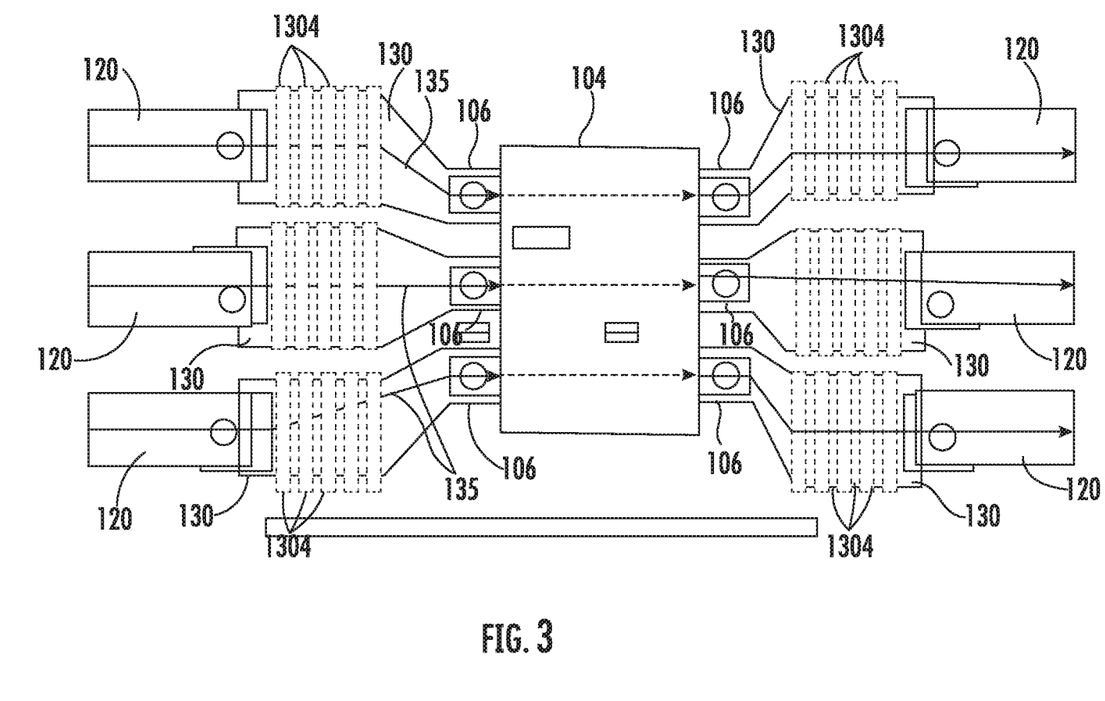
FIG. 3 is a bottom view of the contactor assembly of FIG. 2.
Figure 4:
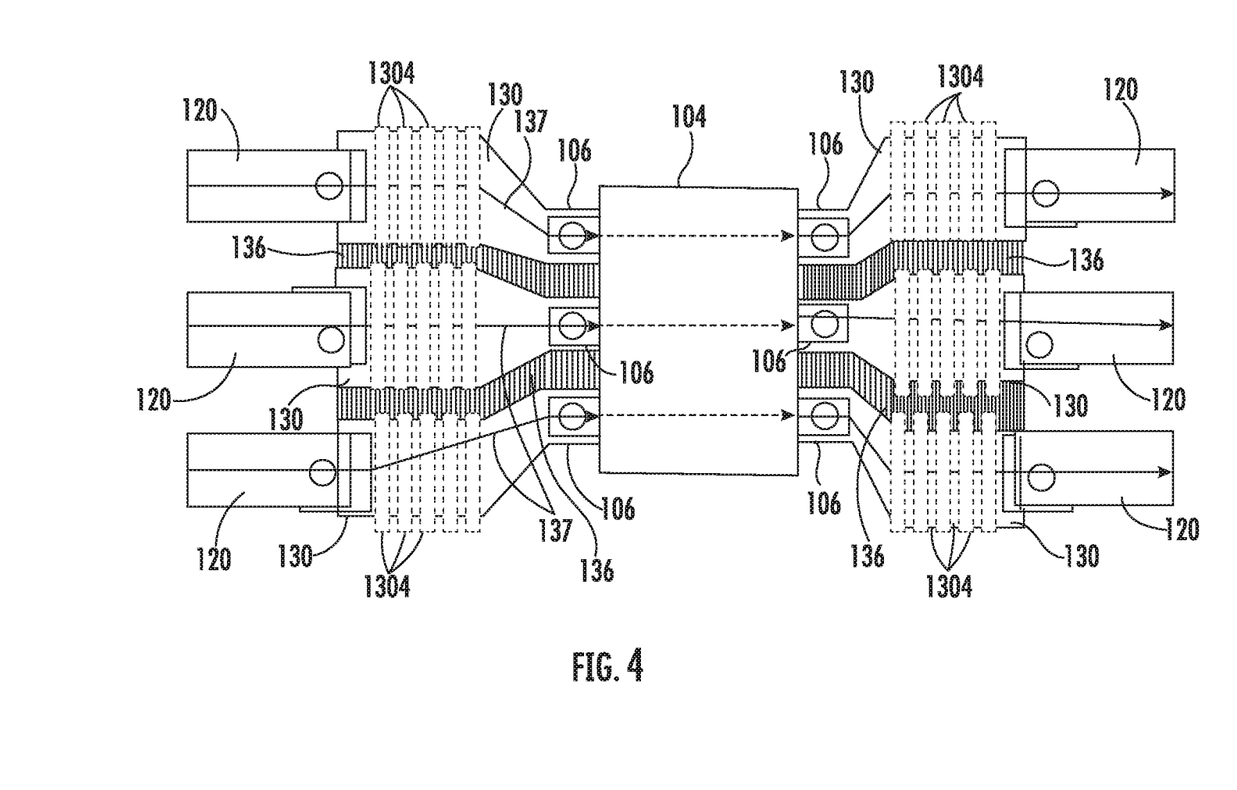
FIG. 4 is a bottom view of a contactor assembly in accordance with further embodiments.

With continued reference to FIG. 2 and with additional reference to FIGS. 3 and 4, the internal bus bars 106 may include a first set of multiple internal bus bars 106 that extend into and terminate at a first side 1041 of the housing 104 and a second set of multiple internal bus bars 106 that extend into and terminate at a second side 1042 of the housing 104. Each individual one of the first set of multiple internal bus bars 106 has a stationary contact pad 1061 at its terminal end and each individual one of the second set of multiple internal bus bars 106 has a stationary contact pad 1062 at its terminal end. Each individual one of the first set of multiple internal bus bars 106 may be respectively associated with a corresponding individual one of the second set of multiple internal bus bars 106.

The contactor assembly 100 further includes a solenoid 111, a plunger 112 with an insulator 113 at a distal end thereof and a movable bus bar 114. At a central portion thereof, the movable bus bar 114 is coupled to the plunger 112 via the insulator 113. At opposite ends thereof, the movable bus bar 114 includes contact pads 1141. The movable bus bar 114 is movable by the solenoid 111 into a first position and a second position. At the first position, the contact pads 1141 of the movable bus bar 114 contact the stationary contact pads 1061 and 1062 such that the corresponding individual internal bus bars 106 are electrically coupled with one another. At the second position, the contact pads 1141 are displaced from the stationary contact pads 1061 and 1062 such that the corresponding internal bus bars 106 are decoupled from one another.

Thus, in operation, the electrical contactor 102 is operable in a first mode or in a second mode. In the first mode, corresponding internal bus bars 106 are electrically coupled with each other in the interior 108 of the housing 104. Here, the current flowing through the internal bus bars 106 and the movable bus bar 114 generates heat which is dispersed as described below. In the second mode, the corresponding internal bus bars 106 are electrically decoupled from one another in the interior 108 of the housing 104.

As shown in FIG. 2 and in accordance with further or additional embodiments, the contactor assembly 100 may include at least one of corrugated fins 115 or flexible straps 116 and straight fins 117. The corrugated fins 115 and the flexible straps 116 extend between the movable bus bar 114 and the housing 104 and thus provide for heat transfer between the movable bus bar 114 and the material of the housing 104. The corrugations of the corrugated fins 115 permit the corrugated fins 115 to absorb the movement of the movable bus bar 114 between the first and second positions. Similarly, the flexibility of the flexible straps 116 permit the flexible straps 116 to absorb the movement of the flexible bar 114 between the first and second positions. The straight fins 117 extend from the movable bus bar 114 to the exterior 110 of the housing 104 and thus provide for heat transfer between the movable bus bar 114 and the air flow through the exterior 110. Seals may be provided in the housing 104 about the straight fins 117.

As shown in FIGS. 2-4, the contactor assembly 100 further includes external bus bars 120 that are respectively associated with corresponding ones of the internal bus bars 106, posts 130 and a panel 140 to which the posts are supportively coupled. The external bus bars 120 may include a first set of multiple external bus bars 120 that extend toward the first side 1041 of the housing 104 and a second set of multiple external bus bars 120 that extend toward the second side 1042 of the housing 104. Each individual one of the first set of multiple external bus bars 120 may be respectively associated with a corresponding individual one of the first set of multiple internal bus bars 106 and each individual one of the second set of multiple external bus bars 120 may be respectively associated with a corresponding individual one of the second set of multiple internal bus bars 106. The posts 130 are respectively supportive of the internal bus bars 106 and are respectively electrically interposed between corresponding pairs of associated external bus bars 120 and internal bus bars 106.

In accordance with embodiments, each post 130 may include a first portion 1301 that is electrically connectable to a corresponding external bus bar 120 at the exterior 110 of the housing 104, a second portion 1302 that is electrically connectable to a corresponding internal bus bar 106 at the exterior 110 of the housing 104, a third portion 1303 that extends between the first and second portions 1301 and 1302 and fins 1304. The fins 1304 extend outwardly from the third portion 1303 and provide for heat transfer from the corresponding movable bus bar 114 and the corresponding internal bus bar 106 to the air flow. As shown in FIG. 2 and in accordance with further or additional embodiments, the first and second portions 1301 and 1302 of each post 130 may be oriented substantially vertically, the third portion 1303 of each post 130 may be oriented substantially horizontally and the fins 1304 of each post 130 may be arranged with substantially uniform separations and may be oriented substantially vertically. In addition, the fins 1304 can be disposed on either top or bottom or both top and bottom surfaces depending on the panel configuration.

As shown in FIG. 3, where the internal bus bars 106 include or are provided as multiple internal bus bars 106 at the first and second sides 1041 and 1042 of the housing 104 and where the external bus bars 120 include or are provided as multiple external bus bars 120 at the first and second sides 1041 and 1042 of the housing 104, the first and second portions 1301 and 1302 of each post 130 are respectively connected to single ones of the multiple external and internal bus bars 120 and 106. That is, in the example of FIG. 3, each post 130 on each side of the housing 104 provides for a single electrical current pathway 135.

As shown in FIG. 4, where the internal bus bars 106 include or are provided as multiple internal bus bars 106 at the first and second sides 1041 and 1042 of the housing 104 and where the external bus bars 120 include or are provided as multiple external bus bars 120 at the first and second sides 1041 and 1042 of the housing 104, the first and second portions 1301 and 1302 of each post 130 are respectively connected to all of the multiple external and internal bus bars 120 and 106. That is, in the example of FIG. 4, each post 130 on each side of the housing 104 includes additional material 136 that may be at least one of thermally and/or electrically non-conductive. For example, where the additional material 136 is a dielectric material (e.g., aluminum nitride) that is highly thermally conductive, each post 130 on each side of the housing 104 provides for a single electrical current pathway 137 but the additional material 136 provides for increased heat transfer.

Figure 5:
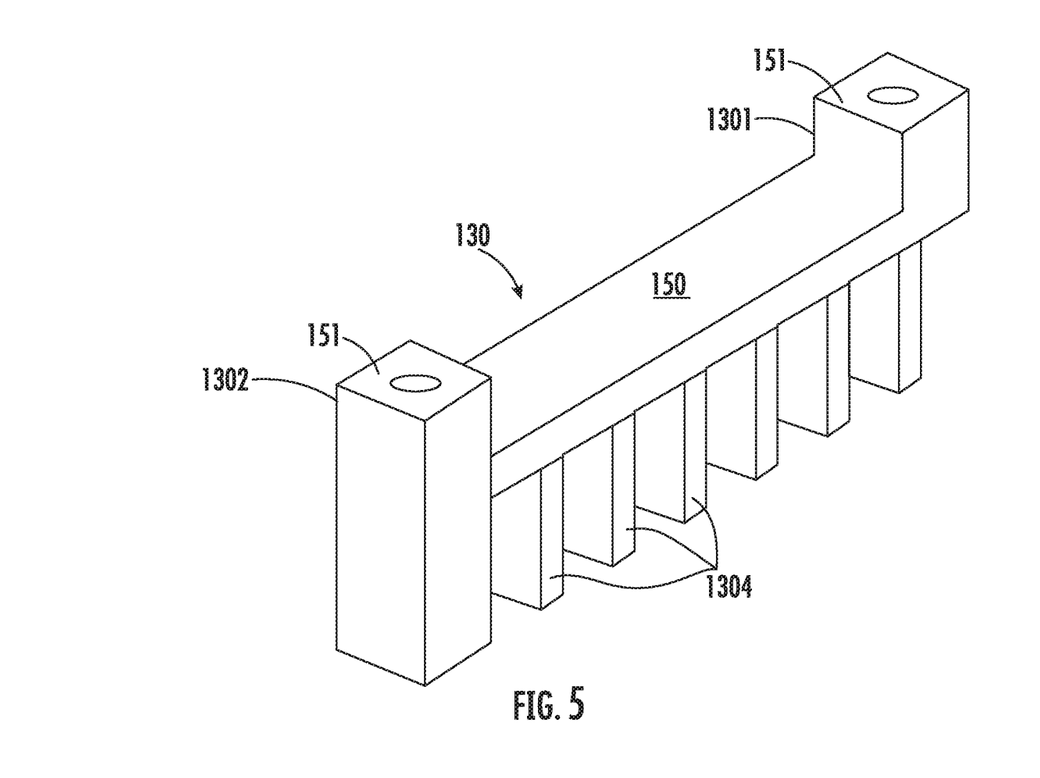
FIG. 5 is a perspective view of a post of the contactor assembly of FIGS. 2 and 3 in accordance with embodiments.

In accordance with embodiments, the first and second portions 1301 and 1302 of each post 130 may be respectively metallurgically bonded (e.g., brazed) to at least one of the external and internal bus bars 120 and 106 or integrally connected with at least one of the external and internal bus bars 120 and 106. With reference to FIG. 5 and in accordance with further embodiments, the posts 130 may be provided with an insulating outer layer 150 and the metallurgical bonding between the first and second portions 1301 and 1302 may be improved in terms of reliability by masking 151 contact surfaces while the insulating outer layer 150 is laid down. Here, once the insulating outer layer 150 is completely laid down, the masking 151 can be removed so expose the uninsulated metallic material of the posts 130.

The description provided above relates to a structure that reduces contactor temperature so that a range of power from a power panel can be increased. As an example, a power panel that is thermally limited to provide full power up to a maximum ambient temperature due to a thermal limitation will be able to provide full power up to maximum ambient temperature. Reduced contactor temperature will also result in an increased reliability of contactors.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A contactor assembly post, comprising:
a first portion electrically connected to an external bus bar at an exterior of an electrical contactor housing;
a second portion electrically connected to an internal bus bar at the exterior of the electrical contactor housing,
the first and second portions respectively comprising first and second parallel and offset longitudinal axes and complementary first and second surfaces that face in opposite directions, and the internal bus bar being configured to extend into an interior of the electrical contactor housing to be electrically coupled to another internal bus bar;
a third portion extending transversely between the first and second portions, the third portion comprising opposite first and second ends connected to the first and second surfaces, respectively; and
fins extending transversely from multiple points defined along a third longitudinal axis of the third portion extending between the first and second ends thereof.

2. The contactor assembly post according to claim 1, wherein:
the first and second portions are oriented substantially vertically and substantially perpendicularly with respect to the third longitudinal axis,
the third portion is oriented substantially horizontally and substantially in parallel with the third longitudinal axis, and
the fins are oriented substantially vertically and substantially perpendicularly with respect to the third longitudinal axis.

3. The contactor assembly post according to claim 1, wherein the first portion is metallurgically bonded to the external and internal bus bars.

4. The contactor assembly post according to claim 1, wherein the second portion is metallurgically bonded to the external and internal bus bars.

5. The contactor assembly post according to claim 1, wherein the first portion is integrally connected with the external and internal bus bars.

6. The contactor assembly post according to claim 1, wherein the second portion is integrally connected with the external and internal bus bars.

7. The contactor assembly post according to claim 1, further comprising an insulating outer layer.

8. The contactor assembly post according to claim 1, wherein:
the internal bus bar comprises multiple internal bus bars,
the external bus bar comprises multiple external bus bars, and
the first and second portions are respectively connected to single ones of the multiple external and internal bus bars.

9. The contactor assembly post according to claim 1, wherein:
the internal bus bar comprises multiple internal bus bars,
the external bus bar comprises multiple external bus bars, and
the first and second portions are respectively connected to all of the multiple external and internal bus bars.

10. A contactor assembly post, comprising:
a first portion electrically connected to an external bus bar;
a second portion electrically connected to an internal bus bar, the internal bus bar being configured to extend into an interior of an electrical contactor housing to be electrically coupled to another internal bus bar,
wherein the first and second portions respectively comprise:
first and second longitudinal axes which are parallel and offset from one another; and
complementary first and second surfaces that face each other in opposite directions;
a third portion extending transversely between the first and second portions, the third portion comprising a first end connected to the first surface of the first portion and a second end opposite the first end connected to the second surface of the second portion; and
fins extending transversely from multiple points defined along a third longitudinal axis of the third portion, which extends from the first end thereof to the second end thereof.

11. The contactor assembly post according to claim 10, wherein the first and second portions are oriented substantially vertically and substantially perpendicularly with respect to the third longitudinal axis.

12. The contactor assembly post according to claim 11, wherein the third portion is oriented substantially horizontally and substantially in parallel with the third longitudinal axis.

13. The contactor assembly post according to claim 12, wherein the fins are oriented substantially vertically and substantially perpendicularly with respect to the third longitudinal axis.

14. The contactor assembly post according to claim 10, wherein the first portion is metallurgically bonded to the external and internal bus bars.

15. The contactor assembly post according to claim 10, wherein the second portion is metallurgically bonded to the external and internal bus bars.

16. The contactor assembly post according to claim 10, wherein the first portion is integrally connected with the external and internal bus bars.

17. The contactor assembly post according to claim 10, wherein the second portion is integrally connected with the external and internal bus bars.

18. The contactor assembly post according to claim 10, further comprising an insulating outer layer.

19. The contactor assembly post according to claim 10, wherein:
the internal bus bar comprises multiple internal bus bars,
the external bus bar comprises multiple external bus bars, and
the first and second portions are respectively connected to single ones of the multiple external and internal bus bars.

20. The contactor assembly post according to claim 10, wherein:
the internal bus bar comprises multiple internal bus bars,
the external bus bar comprises multiple external bus bars, and
the first and second portions are respectively connected to all of the multiple external and internal bus bars.

* * * * *